(12) United States Patent
Jefremov et al.

(10) Patent No.: US 10,412,305 B2
(45) Date of Patent: Sep. 10, 2019

(54) VIDEO STABILIZATION

(71) Applicant: Skype, Dublin (IE)

(72) Inventors: Andrei Jefremov, Jarfalla (SE); David Yuheng Zhao, Enebyberg (SE); Pontus Carlsson, Bromma (SE)

(73) Assignee: SKYPE, Dublin (IE)

( * ) Notice: Subject to any disclaimer, the term of this patent is extended or adjusted under 35 U.S.C. 154(b) by 1016 days.

(21) Appl. No.: 14/242,512

(22) Filed: Apr. 1, 2014

(65) Prior Publication Data

US 2014/0211028 A1 Jul. 31, 2014

Related U.S. Application Data

(62) Division of application No. 13/296,941, filed on Nov. 15, 2011, now Pat. No. 8,711,233.

(30) Foreign Application Priority Data

May 31, 2011 (GB) .................................. 1109071.9

(51) Int. Cl.
*H04N 5/232* (2006.01)
*H04N 5/345* (2011.01)

(52) U.S. Cl.
CPC ..... *H04N 5/23264* (2013.01); *H04N 5/23258* (2013.01); *H04N 5/23267* (2013.01); *H04N 5/3454* (2013.01)

(58) Field of Classification Search
None
See application file for complete search history.

(56) References Cited

U.S. PATENT DOCUMENTS

| 4,864,409 A | 9/1989 | Platte et al. |
| 4,959,725 A | 9/1990 | Mandle |

(Continued)

FOREIGN PATENT DOCUMENTS

| CN | 1330493 | 1/2002 |
| CN | 1819626 | 6/2006 |

(Continued)

OTHER PUBLICATIONS

"Final Office Action", U.S. Appl. No. 14/230,767, dated Oct. 16, 2015, 13 pages.

(Continued)

*Primary Examiner* — Twyler L Haskins
*Assistant Examiner* — Wesley J Chiu
(74) *Attorney, Agent, or Firm* — Schwegman Lundberg & Woessner, P.A.

(57) ABSTRACT

Method, device and computer program product for stabilizing a video signal. A plurality of frames of the video signal are captured using a camera. A motion sensor associated with the camera is used to generate a plurality of samples representing motion of the camera. The samples are used to determine a displacement of the camera between a first time and a second time, wherein the first time corresponds to an exposure time midpoint of a first frame of the video signal and the second time corresponds to an exposure time midpoint of a second frame of the video signal. The determined displacement is used to compensate for motion in the video signal between the first and second frames caused by the motion of the camera, to thereby stabilize the video signal.

20 Claims, 5 Drawing Sheets

(56) References Cited

U.S. PATENT DOCUMENTS

| | | | |
|---|---|---|---|
| 5,438,361 A * | 8/1995 | Coleman | G01S 3/7864 |
| | | | 348/208.7 |
| 5,990,942 A * | 11/1999 | Ogino | G06T 3/40 |
| | | | 348/169 |
| 6,982,746 B1 * | 1/2006 | Kawahara | H04N 5/23248 |
| | | | 348/208.1 |
| 7,010,045 B2 | 3/2006 | Lee | |
| 7,372,483 B2 * | 5/2008 | Nomura | H04N 5/23248 |
| | | | 348/208.1 |
| 8,358,345 B1 | 1/2013 | Fiore et al. | |
| 8,711,233 B2 | 4/2014 | Jefremov | |
| 8,723,966 B2 | 5/2014 | Owen et al. | |
| 9,635,256 B2 | 4/2017 | Owen et al. | |
| 9,762,799 B2 | 9/2017 | Carlsson et al. | |
| 2002/0118761 A1 | 8/2002 | Lee | |
| 2004/0001147 A1 | 1/2004 | Vella et al. | |
| 2005/0179784 A1 * | 8/2005 | Qi | H04N 5/145 |
| | | | 348/208.1 |
| 2006/0140603 A1 * | 6/2006 | Kurata | H04N 5/23248 |
| | | | 396/55 |
| 2006/0185431 A1 | 8/2006 | Birecki et al. | |
| 2006/0210175 A1 | 9/2006 | Huang et al. | |
| 2007/0122129 A1 | 5/2007 | Sakamoto et al. | |
| 2007/1022129 | 5/2007 | Sakamoto et al. | |
| 2007/0147706 A1 | 6/2007 | Sasaki et al. | |
| 2007/0285521 A1 | 12/2007 | Watanabe et al. | |
| 2007/0296861 A1 * | 12/2007 | Evans | H04N 19/61 |
| | | | 348/488 |
| 2008/0004073 A1 | 1/2008 | John et al. | |
| 2008/0012945 A1 | 1/2008 | Uenaka | |
| 2008/0136931 A1 | 6/2008 | Hatanaka et al. | |
| 2008/0246848 A1 | 10/2008 | Tsubaki et al. | |
| 2009/0096879 A1 * | 4/2009 | Motomura | G03B 5/00 |
| | | | 348/208.6 |
| 2009/0102931 A1 | 4/2009 | Yoshikawa et al. | |
| 2009/0135264 A1 | 5/2009 | John | |
| 2009/0231450 A1 | 9/2009 | Tanaka et al. | |
| 2009/0257679 A1 | 10/2009 | Hogasten | |
| 2009/0309984 A1 | 12/2009 | Bourgain et al. | |
| 2009/0322896 A1 * | 12/2009 | Yoshizumi | H04N 1/2112 |
| | | | 348/222.1 |
| 2010/0033588 A1 | 2/2010 | Thorn | |
| 2010/0060751 A1 | 3/2010 | Pinto et al. | |
| 2010/0220215 A1 * | 9/2010 | Rubinstein | G06F 15/8015 |
| | | | 348/231.99 |
| 2010/0295961 A1 | 11/2010 | Terauchi | |
| 2010/0328472 A1 | 12/2010 | Steinberg et al. | |
| 2011/0007175 A1 * | 1/2011 | Fujita | G03B 5/00 |
| | | | 348/222.1 |
| 2011/0141219 A1 * | 6/2011 | Yeh | G06T 7/20 |
| | | | 348/14.02 |
| 2011/0228112 A1 | 9/2011 | Kaheel et al. | |
| 2012/0069203 A1 | 3/2012 | Voss et al. | |
| 2012/0081558 A1 | 4/2012 | Ogura | |
| 2012/0162449 A1 * | 6/2012 | Braun | H04N 5/145 |
| | | | 348/208.4 |
| 2012/0307086 A1 | 12/2012 | Jefremov et al. | |
| 2013/0076921 A1 * | 3/2013 | Owen | H04N 5/23258 |
| | | | 348/208.4 |
| 2013/0093906 A1 * | 4/2013 | Carlsson | H04N 5/23258 |
| | | | 348/208.99 |
| 2014/0211032 A1 | 7/2014 | Owen | |

FOREIGN PATENT DOCUMENTS

| | | |
|---|---|---|
| CN | 101065964 | 10/2007 |
| CN | 101411181 | 4/2009 |
| CN | 101465956 | 6/2009 |
| CN | 101662582 | 3/2010 |
| CN | 101897174 | 11/2010 |
| DE | 102009058597 | 6/2011 |
| EP | 0520741 | 12/1992 |
| EP | 1377040 | 1/2004 |
| EP | 1679884 | 7/2006 |
| EP | 1978731 | 10/2008 |
| EP | 2028842 | 2/2009 |
| EP | 2219364 | 8/2010 |
| JP | 11098420 | 4/1999 |
| JP | 2003234946 | 8/2003 |
| JP | 2005236662 | 9/2005 |
| JP | 2007522772 | 8/2007 |
| JP | 2009532990 | 9/2009 |
| KR | 20020001087 | 2/2002 |
| WO | WO-2010116366 | 10/2010 |
| WO | WO-2013056202 | 4/2013 |

OTHER PUBLICATIONS

"Foreign Office Action", CN Application No. 201210363053.0, dated Nov. 23, 2015, 8 pages.

"Foreign Office Action", EP Application No. 12725720.2, dated Nov. 12, 2015, 4 pages.

"Restriction Requirement", U.S. Appl. No. 14/242,512, dated Dec. 21, 2015, 6 pages.

"Final Office Action", U.S. Appl. No. 13/307,800, dated Jul. 5, 2013, 15 pages.

"International Search Report and Written Opinion", Application No. PCT/US2012/057402, dated Jan. 25, 2013, 15 pages.

"International Search Report and Written Opinion", Application No. PCT/EP2012/060315, dated Jan. 17, 2013, 19 pages.

"Non-Final Office Action", U.S. Appl. No. 13/296,941, dated Jun. 6, 2013, 15 pages.

"Non-Final Office Action", U.S. Appl. No. 13/307,800, dated Nov. 26, 2012, 13 pages.

"Notice of Allowance", U.S. Appl. No. 13/296,941, dated Dec. 10, 2013, 21 pages.

"Notice of Allowance", U.S. Appl. No. 13/307,800, dated Nov. 29, 2013, 8 pages.

"Partial International Search Report", Application No. PCT/EP2012/060315, dated Aug. 28, 2012, 5 pages.

"Restriction Requirement", U.S. Appl. No. 13/296,941, dated Apr. 25, 2013, 6 pages.

"Search Report", GB Application No. 1109071.9, dated Nov. 5, 2012, 4 pages.

Chen, et al., ' "SaVE: Sensor-assisted Motion Estimation for Efficient H.264/AVC Video Encoding", MM '09, (Oct. 19-24, 2009), Beijing, China, Oct. 19, 2009, 10 pages.

Drahansky, et al., ' "Accelerometer Based Digital Video Stabilization for General Security Surveillance Systems", International Journal of Security and its Applications, vol. 1, No. 1, 1-10, Jan. 2010, 10 pages.

Hong, et al., ' "SenseCoding: Accelerometer-Assisted Motion Estimation for Efficient Video Encoding", Proceedings of the 2008 ACM International Conference on Multimedia with Co-Located Symposium & Workshops: Area '08, Communicabilityms '08, HCC '08, MIR '08, MS'08, SAME '08, SRMC '08, TVS '08, VNBA '08: Vancouver, BC, Canada, Oct. 27-31, 2008, XP0079186, Oct. 26, 2008, pp. 749-752.

Karpenko, et al., ' "Digital Video Stabilization and Rolling Shutter Correction using Gyroscopes", Stanford Tech Report CTSR Mar. 2011, Mar. 2011, 7 pages.

Lin, "Using Sensors for Efficient Video Coding in Hand-Held Devices", Stanford University, Nov. 12, 2010, 5 page.

Yang, et al., ' "Online Video Stabilization Based on Particle Filters", Image Processing, 2006 IEEE International Conference (Oct. 8-11, 2006), Oct. 8, 2006, 4 pages.

"Non-Final Office Action", U.S. Appl. No. 14/230,767, dated Apr. 7, 2015, 15 pages.

"Foreign Office Action", CN Application No. 201210363053.0, dated Jun. 17, 2015, 7 pages.

"Non-Final Office Action", U.S. Appl. No. 14/230,767, dated May 29, 2014, 11 pages.

"Final Office Action", U.S. Appl. No. 14/230,767, dated Dec. 8, 2014, 14 pages.

"Foreign Office Action", CN Application No. 20120363053.0, dated Sep. 29, 2014, 26 pages.

(56) References Cited

OTHER PUBLICATIONS

"Combined Search Report and Examination Report", GB Application No. 1117774.8, dated Apr. 15, 2013, 5 pages.
"Final Office Action", U.S. Appl. No. 13/339,879, dated Jan. 2, 2015, 21 pages.
"Final Office Action", U.S. Appl. No. 13/339,879, dated Feb. 19, 2014, 19 pages.
"Final Office Action", U.S. Appl. No. 13/339,879, dated Nov. 19, 2015, 34 pages.
"Foreign Notice of Allowance", CN Application No. 201210363053.0, dated Apr. 27, 2016, 4 pages.
"Foreign Office Action", CN Application No. 201210388814.8, dated Apr. 1, 2015, 14 pages.
"Foreign Office Action", CN Application No. 201210388814.8, dated Dec. 8, 2015, 14 pages.
"Foreign Office Action", CN Application No. 201280026334.5, dated Mar. 29, 2016, 21 pages.
"Foreign Office Action", EP Application No. 12788338.7, dated May 15, 2015, 4 pages.
"Foreign Office Action", EP Application No. 12788338.7, dated Dec. 23, 2015, 4 pages.
"Foreign Office Action", GB Application No. 1117774.8, dated Jul. 8, 2014, 3 pages.
"International Search Report and Written Opinion", Application No. PCT/US2012/060167, dated Jan. 7, 2013, 19 pages.
"Non-Final Office Action", U.S. Appl. No. 13/339,879, dated May 8, 2015, 22 pages.
"Non-Final Office Action", U.S. Appl. No. 13/339,879, dated Jun. 5, 2014, 17 pages.
"Non-Final Office Action", U.S. Appl. No. 13/339,879, dated Jul. 19, 2013, 13 pages.
"Non-Final Office Action", U.S. Appl. No. 14/230,767, dated Feb. 17, 2016, 12 pages.
"Corrected Notice of Allowance", U.S. Appl. No. 14/230,767, dated Nov. 25, 2016, 2 pages.
"Notice of Allowance", U.S. Appl. No. 13/339,879, dated Feb. 1, 2017, 20 pages.
"Foreign Office Action", GB Application No. 1109071.9, dated Nov. 14, 2016, 4 pages.
"Extended European Search Report", EP Application No. 16165181.5, dated Aug. 18, 2016, 7 pages.
"Extended European Search Report", EP Application No. 16165182.3, dated Aug. 18, 2016, 6 pages.
"Foreign Notice of Allowance", CN Application No. 201210388814.8, dated Sep. 7, 2016, 4 pages.
"Foreign Office Action", CN Application No. 201280026334.5, dated Oct. 21, 2016, 8 pages.
"Foreign Office Action", JP Application No. 2014-535968, dated Sep. 27, 2016, 12 pages.
"Notice of Allowance", U.S. Appl. No. 14/230,767, dated Sep. 22, 2016, 10 pages.
"Foreign Notice of Allowance", CN Application No. 201280026334.5, dated Jan. 3, 2017, 4 pages.
"Foreign Notice of Allowance", JP Application No. 2014-535968, dated Feb. 28, 2017, 4 pages.
"Foreign Office Action", CN Application No. 201210388814.8, dated Jun. 3, 2016, 6 pages.
"Notice of Allowance", U.S. Appl. No. 13/339,879, dated May 5, 2017, 20 pages.
"Supplemental Notice of Allowance", U.S. Appl. No. 13/339,879, dated Jul. 7, 2017, 17 pages.
"Foreign Office Action", EP Application No. 16165181.5, dated Aug. 8, 2017, 4 pages.
"Foreign Office Action", EP Application No. 16165182.3, dated Aug. 8, 2017, 4 pages.
"Supplementary Search Report Issued in European Patent Application No. 12725720.2", dated Aug. 18, 2016, 6 Pages.
"Office Action Issued in European Patent Application No. 16165181.5", dated Jul. 24, 2018, 4 Pages.
"Office Action Issued in Chinese Patent Application No. 201610730793.1", dated Aug. 9, 2018, 10 Pages.
"Office Action Issued in Chinese Patent Application No. 201610730793.1", dated Apr. 3, 2019, 4 Pages.

\* cited by examiner

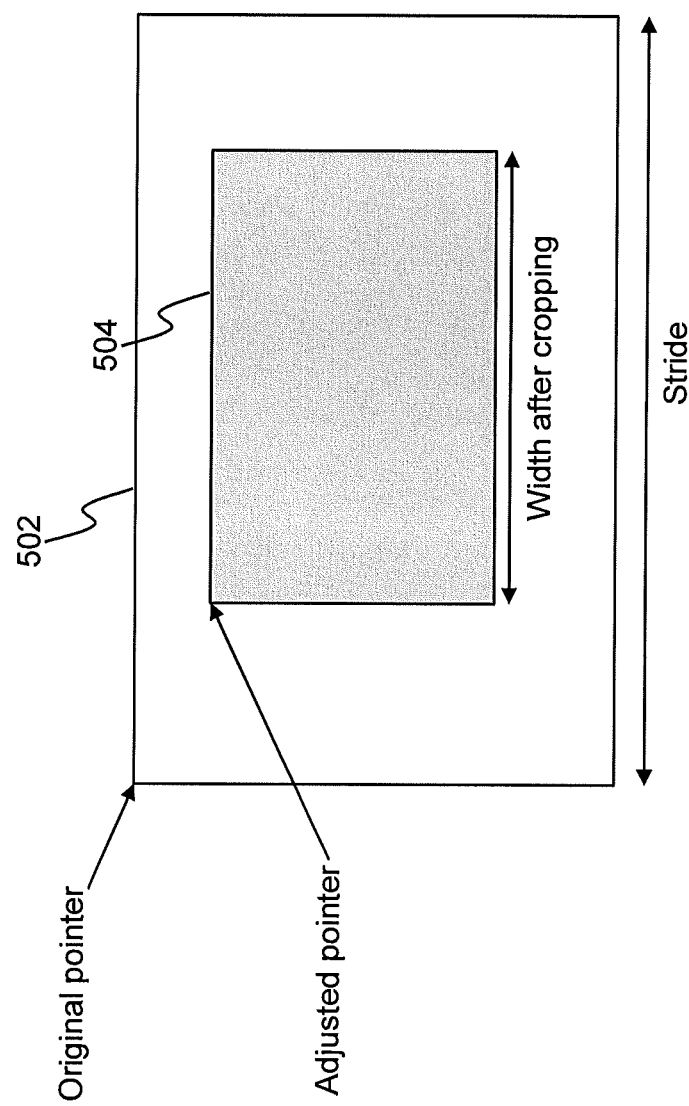

VIDEO STABILIZATION

RELATED APPLICATION

This application is a divisional of and claims priority to U.S. patent application Ser. No. 13/296,941 filed Nov. 15, 2011 and Ser. No. 13/296,941 claims priority under 35 U.S.C. § 119 or 365 to Great Britain Application No. GB 1109071.9, filed May 31, 2011, the disclosures of which are incorporated by reference herein in their entirety.

BACKGROUND

Cameras can be used to capture a sequence of images to be used as frames of a video signal. Cameras may be fixed to stable objects, for example a camera may be mounted on a stand such as a tripod to thereby keep the camera still while the video frames are captured. However, often cameras may be implemented in mobile devices and are not necessarily mounted to fixed objects, for example a camera may be held, or may be on a moving object such as a vehicle. Movement of the camera while the camera is capturing frames of a video signal may result in unwanted movement in the video signal itself.

Image stabilization is a method that can be used to compensate for the unwanted movement in a video signal. Some systems perform motion estimation in order generate motion vectors for use by an image stabilization process. One such system is described in "Online Video Stabilization Based on Particle Filters" by Junlan Yang et. al. Image stabilization algorithms may consist of three main parts: motion estimation, motion smoothing and motion compensation. A motion estimation block may estimate local motion vectors within the video signal and on the basis of these local estimates calculate a global motion vector. A motion smoothing block may then deal with filtering of the estimated global motion vector in order to smooth the calculated value and prevent large and undesirable differences between motion vectors calculated previously. A motion compensation block may then shift an image in the opposite direction to the filtered global motion vector to thereby stabilize the video signal. The motion compensation block may take into account sophisticated transformations like rotation, warping or zooming.

It can require large amounts of processing resources to perform image stabilization based on motion vectors as described above. This can be a problem when the video signal is to be stabilized in real time, i.e. when a stabilized version of the video signal is to be used (e.g. transmitted in a video call or output from a device) at the same time as it is being captured by the camera. This can also be a problem when the device which is performing the image stabilization is a small, mobile device such as a mobile telephone in which the processing resources are limited.

In recent years, motion sensors have become simpler and cheaper to manufacture and the size of motion sensors has reduced significantly. It is now feasible to implement motion sensors in mobile devices. Motion sensors generate samples representing the motion of the sensor. Two documents: "Using Sensors for Efficient Video Coding in Hand-held devices" by Andy L. Lin and "Accelerometer Based Digital Video Stabilization for General Security Surveillance Systems" by Martin Drahanský et. al, mention the possibility of using data from motion sensors for stabilization of a video signal.

SUMMARY

The inventors have realised that the implementation of using data from motion sensors for stabilization of a video signal can be improved compared to the systems of the prior art. In particular, the inventors have considered factors such as: handling non-uniformly sampled sensor data; synchronization of sampled sensor data with the timing of frames of the video signal taking the shutter speed of the camera into account; fast pixel shifting of an image of one of the frames of the video signal by pointer modification; and how to select sensor sampling rate. These factors have not been considered in the references cited in the background section above.

According to a first aspect there is provided a method of stabilizing a video signal, the method comprising: capturing a plurality of frames of the video signal using a camera; using a motion sensor associated with the camera to generate a plurality of samples representing motion of the camera; using the samples to determine a displacement of the camera between a first time and a second time, wherein the first time corresponds to an exposure time midpoint of a first frame of the video signal and the second time corresponds to an exposure time midpoint of a second frame of the video signal; and using the determined displacement to compensate for motion in the video signal between the first and second frames caused by the motion of the camera, to thereby stabilize the video signal.

Time stamps provided by the camera for the frames of the video signal may relate to the time at which a shutter of the camera closes (i.e. the end time of the frame). However, the inventors have identified that in order to effectively determine the displacement (e.g. an angular displacement) between the first and second frames of the video signal using data from the motion sensor (e.g. a rotational motion sensor), it is advantageous to determine the displacement of the camera between the midpoints of the exposure times of the frames. Using the midpoints of the exposure times of the frames provides a more accurate representation of the displacement of the camera between the first and second frames. When mapping camera displacement to pixel displacement, this method provides better estimation of pixel displacement than using the end times of the frames.

In various embodiments, the motion of the camera is rotational motion, the motion sensor is a rotational motion sensor and the displacement of the camera is an angular displacement of the camera. The using of the samples to determine an angular displacement of the camera between a first time and a second time may comprises: determining an angular velocity of the camera using the samples; and integrating the determined angular velocity over time from the first time to the second time to thereby determine the angular displacement of the camera between the first time and the second time.

In one embodiment, the angular displacement of the camera between the first time and the second time is given by the equation:

$$\Delta\theta = \int_{t_1-0.5e_1}^{t_2-0.5e_2} \omega(t)dt$$

where $\Delta\theta$ is the angular displacement of the camera, $t_1$ is end time of the first frame, $t_2$ is end time of the second frame, $e_1$ is the exposure time of the first frame, $e_2$ is the exposure time of the second frame and $\omega(t)$ is the angular velocity of the camera determined using the samples.

The integrating of the determined angular velocity may comprise interpolating the angular velocity between the times at which the samples are generated and the method may further comprise delaying the video signal thereby allowing the angular velocity of the camera at the second time to be determined by said interpolating the angular velocity between the times at which the samples are generated.

The method may further comprise extrapolating the angular velocity determined using the samples to thereby determine the angular velocity of the camera at the second time.

The sample rate of the samples generated using the motion sensor may be higher than the frame rate of the video signal. Furthermore, the camera and the motion sensor may be situated within a mobile device.

The using of the determined displacement to compensate for motion in the video signal between the first and second frames caused by the motion of the camera may comprise: determining a pixel displacement representing motion in the video signal between the first and second frames caused by the determined displacement of the camera; filtering the pixel displacement; and shifting the image of at least one of the first and second frames in accordance with the filtered pixel displacement to thereby stabilize the video signal. The filtering of the pixel displacement may comprise: determining an accumulated pixel displacement based on said determined pixel displacement for the second frame; and determining a filtered accumulated pixel displacement for the second frame based on a weighted sum of the determined accumulated pixel displacement for the second frame and a filtered accumulated pixel displacement for the first frame.

The method may further comprise adding a time offset to at least one of (i) the captured plurality of frames, and (ii) the generated plurality of samples, such that the timing of the captured plurality of frames matches the timing of the generated plurality of samples.

According to a second aspect there is provided a device for stabilizing a video signal, the device comprising: a camera configured to capture a plurality of frames of the video signal; a motion sensor, associated with the camera, configured to generate a plurality of samples representing motion of the camera; a displacement determining block configured to use the samples to determine a displacement of the camera between a first time and a second time, wherein the first time corresponds to an exposure time midpoint of a first frame of the video signal and the second time corresponds to an exposure time midpoint of a second frame of the video signal; and a motion compensation block configured to use the determined displacement to compensate for motion in the video signal between the first and second frames caused by the motion of the camera, to thereby stabilize the video signal.

The motion sensor may be a gyroscopic motion sensor. The device may be a mobile device.

According to a third aspect there is provided a method of stabilizing a video signal, the method comprising: capturing a plurality of frames of the video signal using a camera; determining a pixel displacement representing motion in the video signal between first and second frames of the video signal caused by motion of the camera; and shifting an image of at least one of the first and second frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein said shifting of the image comprises adjusting the pointer and the width value without adjusting the stride value.

In this way, the image may be shifted and resized by simply changing the pointer and the width value whilst keeping the stride value constant. In this way, no copying of data in memory is necessary. In other words, instead of copying a crop area into a new memory area (which can be a complex process), an image representation is used that allows for independent width and stride values. In this way, a new image can be created by changing the pointer and the width value while the stride is kept intact (which is a simpler process than copying a crop area into a new memory area).

The image may comprise a plurality of image planes which are each represented by a respective plurality of pixel values, a respective pointer indicating the position of a first pixel of the image plane, and a respective width value indicating the width of the image plane, wherein the image planes may be shifted together by adjusting their respective pointers and width values without adjusting the stride value.

The method may further comprise rounding the determined pixel displacement to an integer-pixel displacement.

The method may further comprise: using a motion sensor associated with the camera to generate a plurality of samples representing motion of the camera; and using the samples to determine a displacement of the camera between a first frame of the video signal and a second frame of the video signal, wherein the determined displacement is used to determine said pixel displacement.

The method may further comprise filtering the pixel displacement.

According to a fourth aspect there is provided a device for stabilizing a video signal, the device comprising: a camera configured to capture a plurality of frames of the video signal; a pixel displacement determining block configured to determine a pixel displacement representing motion in the video signal between first and second frames of the video signal caused by motion of the camera; and an image shifting block configured to shift an image of at least one of the first and second frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein the image shifting block is configured to shift the image by adjusting the pointer and the width value without adjusting the stride value.

According to a fifth aspect there is provided a method of stabilizing a video signal, the method comprising: capturing a plurality of frames of the video signal using a camera; determining a portion of motion of the camera occurring whilst a shutter of the camera is closed and not whilst the shutter of the camera is open; determining a pixel displacement representing motion in the video signal between first and second frames of the video signal caused by, and corresponding to, the portion of motion of the camera; and shifting an image of at least one of the first and second frames in accordance with the pixel displacement to thereby stabilize the video signal.

In this way, image stabilization may be reduced when motion blur is present in the video signal. For high levels of camera motion, motion blur will be present in the frames of the video signal for devices without physical stabilization, such as optical or mechanical stabilization. Motion blur is caused when the camera moves whilst the shutter of the camera is open and capturing one frame of the video signal. If image stabilization were applied for frames containing motion blur, the resulting video signal will contain motion blur but no motion which can be detrimental because a user viewing the video signal may perceive this to look strange and/or unnatural. The inventors have realised that it may be beneficial to have no compensation for motion that is made during the time interval when the camera shutter is open. If the exposure time (i.e. the time for which the shutter is open) is very short, then having no compensation for motion that occurs whilst the shutter is open will not make a significant difference. However, if the exposure time (i.e. the time for which the shutter is open) is very long, then little stabilization will be applied to the video signal. Furthermore, motion blur will be accompanied by the corresponding motion in the video signal, which may be perceived as more natural to a user viewing the video signal.

The method may further comprise: using a motion sensor associated with the camera to generate a plurality of samples representing the portion of motion of the camera; and using the samples to determine a displacement of the camera between the first frame of the video signal and the second frame of the video signal, wherein the determined displacement is used to determine said pixel displacement.

According to a sixth aspect there is provided a device for stabilizing a video signal, the device comprising: a camera configured to capture a plurality of frames of the video signal; a motion determining block configured to determine a portion of motion of the camera occurring whilst a shutter of the camera is closed and not whilst the shutter of the camera is open; a pixel displacement determining block configured to determine a pixel displacement representing motion in the video signal between first and second frames of the video signal caused by, and corresponding to, the portion of motion of the camera; and an image shifting block configured to shift an image of at least one of the first and second frames in accordance with the pixel displacement to thereby stabilize the video signal.

According to a seventh aspect there is provided a computer program product for stabilizing a video signal, the computer program product being embodied on a non-transient computer-readable medium and configured so as when executed on a processor of a device to perform the operations of any of the methods described herein.

There are described herein methods for using motion sensor data to remove camera shaking (and other motion of the camera) from a video signal to thereby stabilize the video signal, for example for use in a mobile device. The methods may comprise synchronising sensor data with camera frames and, in particular, determining the angular displacement at the midpoint of the exposure time. The methods may comprise filtering image displacement values using an exponential filter suitable for use with non-uniformly sampled sample data from the motion sensor. The methods may comprise modifying the position of a pointer for shifting and/or cropping an image of a frame of the video signal based on determined motion of the camera. The methods may comprise adapting image stabilization for frames of the video signal containing motion blur.

BRIEF DESCRIPTION OF THE DRAWINGS

For a better understanding of the described embodiments and to show how the same may be put into effect, reference will now be made, by way of example, to the following drawings in which:

FIG. 5 is a representation of an image before and after a cropping process.

DETAILED DESCRIPTION

Figure 1:
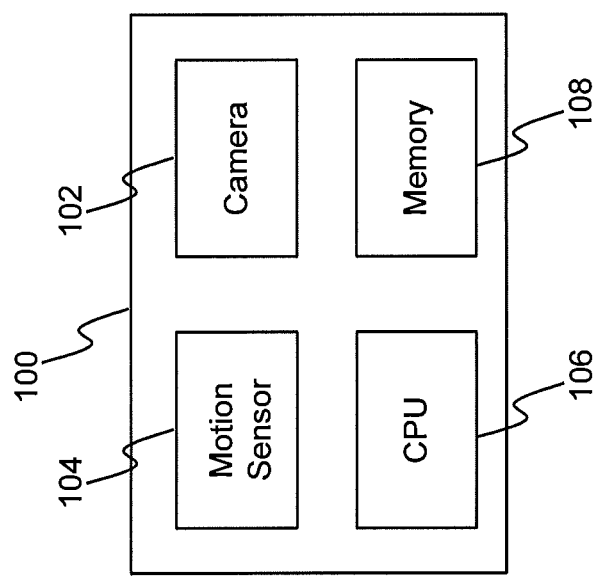
FIG. 1 shows a device according to one embodiment.

FIG. 1 shows a device 100 according to one embodiment. The device 100 may for example be a mobile device such as a mobile telephone or other hand-held device. The device 100 comprises a camera 102, a motion sensor 104, a CPU 106 and a memory 108. The camera 102 is configured to capture images. The captured images may be used to form a video signal, whereby each image is used as a frame of the video signal and the images are captured at the frame rate of the video signal. The frame rate may be, for example, 25 frames per second although the camera may operate at a different frame rate. The minimum frame rate to achieve the perception of a moving image is about fifteen frames per second, but this may depend upon the person viewing the video signal and upon the content that is in the video signal (i.e. how much motion there is in the subject matter of the video signal). The motion sensor 104 is configured to generate samples representing the motion of the device 100. Since both the motion sensor 104 and the camera 102 are in the device 100, they are associated with each other such that the samples generated by the motion sensor 104 can be used to represent the motion of the camera 102. The CPU 106 is configured to perform computational processes on the device 100 as is known in the art. The memory 108 is used to store data in the device 100 as is known in the art. The blocks 102, 104, 106 and 108 can communicate with each other by sending data via a bus of the device 100 (not shown in FIG. 1) as is known in the art.

Figure 2:
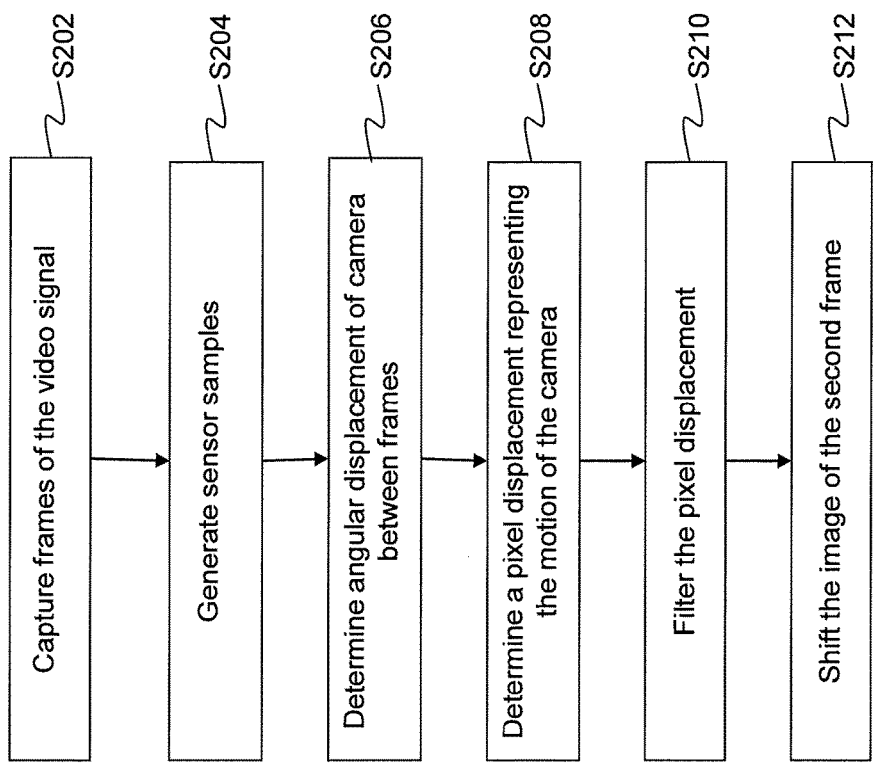
FIG. 2 is a flow chart for a process of stabilizing a video signal according to one embodiment.

With reference to FIG. 2 there is now described a process of stabilizing a video signal using the device 100 according to one embodiment. In step S202 the camera 102 captures images to be used as frames of a video signal. For example, the camera 102 may have an array of light sensors which record the level of light that is incident on the sensors during the time allocated to a frame of the video signal. A shutter of the camera 102 is used to separate the frames in time, such that during each frame the shutter is open for a period of time and closed for another period of time. The captured frames of video signal are provided to a pre-processor (e.g. implemented in a processing block by the CPU 106). The pre-processor operates to stabilize the images in the frames of the video signal before the frames are encoded using a video encoding technique as is known in the art.

In step S204, while the camera 102 is capturing frames of the video signal, the motion sensor 104 generates samples representing the motion of the device 100. For example, the motion sensor 104 may be a rotational motion sensor such as a gyroscope. The gyroscope 104 measures angular velocity of the device 100 and outputs samples representing the angular velocity at particular intervals. The intervals may, or may not, be regular intervals. In at least some instances, on average the sample rate of the samples output from the gyroscope 104 is higher than the frame rate of the video signal. For example, the sample rate output from the gyroscope 104 may be 60 samples per second, which reflects the maximum usual shaking frequency of the device 100 and is currently independent of frame rate. The samples generated by the gyroscope 104 are provided to the pre-processor.

In step S206 the angular displacement of the camera 102 between two frames (frame 1 and frame 2) of the video signal is determined. This determination may be performed by a processing block of the CPU 106. The inventors have identified that in order to effectively determine the angular displacement between the two frames using data from the gyroscope 104, it is useful to integrate the angular velocity over the time interval between the midpoints of the exposure times of the frames captured by the camera 102. The inventors have also determined that this can be particularly problematic as it may not be possible to synchronise the sampling rate of the gyroscope 104 with the frame rate of the camera 102, particularly when:
- the camera 102 is arranged to adjust the exposure times in dependence on the available light (which many cameras are);
- the time stamps for the frames of the video signal provided by the camera 102 relate to the times at which the shutter closes (i.e. the end times of the frames, as opposed to the midpoints of the exposure times of the frames); and
- the gyroscope data is not available at the midpoint of the exposure time of the frames.

As described above, the pre-processor receives video frames from the camera 102 and also receives the samples from the gyroscope 104. The samples from the gyroscope 104 are provided to the pre-processor (e.g. at regular intervals), at a rate at least equivalent to the frame rate of the video signal captured by the camera 102. Using a higher sampling rate in the gyroscope 104 gives more accurate angle estimates but can be more costly in terms of CPU usage.

A time stamp, $t_1$, provided by the camera 102 to a first frame (frame 1) of the video signal indicates the end time of the frame, i.e. the time at which the shutter of the camera 102 is closed to end frame 1. Similarly, a time stamp, $t_2$, provided by the camera 102 to a second frame (frame 2) of the video signal indicates the end time of the frame, i.e. the time at which the shutter of the camera 102 is closed to end frame 2. In order to determine the angular displacement ($\Delta\theta$) of the device 100 between the first frame and the second frame, rather than using the time stamps of the frames to denote the times of the frames, it is more accurate to use the midpoints of the exposure time of frame 1 and frame 2. The exposure times of the first and second frames are denoted by $e_1$ and $e_2$. The angular displacement is determined by integrating the angular velocity (represented by the samples output from the gyroscope 104) of the device 100 between a time $t_1-0.5e_1$ and a time $t_2-0.5e_2$. Therefore the angular displacement between frame 1 and frame 2 is given by:

$$\Delta\theta=\theta(t_2)-\theta(t_1)=\int_{t_1-0.5e_1}^{t_2-0.5e_2}\omega(t)dt$$

Figure 3:
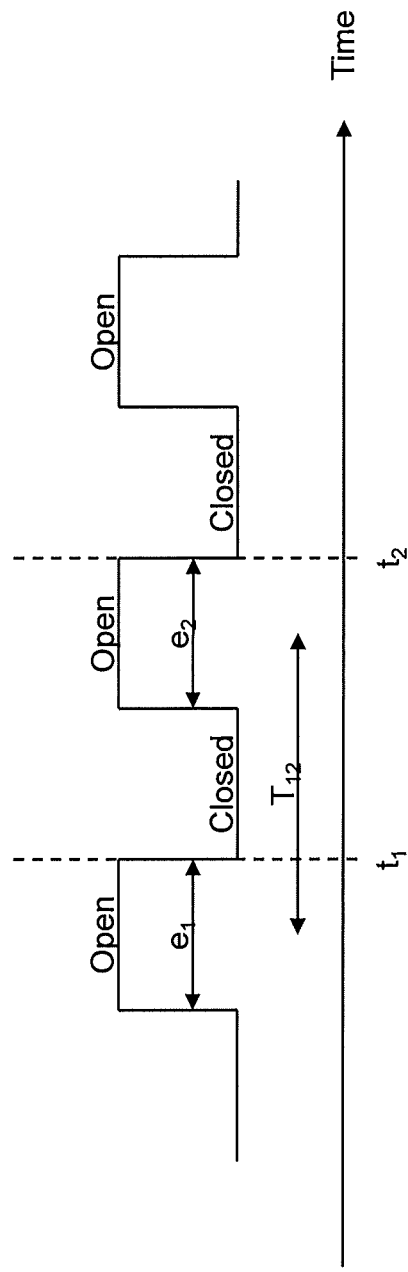
FIG. 3 is an exemplary graphical representation of a shutter position of a camera over time.

FIG. 3 is an exemplary graphical representation of a shutter position of the camera 102 over time. The shutter of the camera 102 closes at time $t_1$ at the end of frame 1. The shutter re-opens again for the camera 102 to capture frame 2 and then closes at time $t_2$ at the end of frame 2. The exposure time of frame 1 is shown as $e_1$ and the exposure time of frame 2 is shown as $e_2$ in FIG. 3. The time over which the angular velocity is integrated is denoted $T_{12}$ in FIG. 3. It can be appreciated from looking at FIG. 3 that integrating over the time $T_{12}$ corresponds to integrating between the midpoint of the exposure time of the first frame (at time $t_1-0.5e_1$) and the midpoint of the exposure time of the second frame (at time $t_2-0.5e_2$). FIG. 3 shows the open time of the shutter to be equal to the closed time of the shutter, but this is just one example. In some embodiments (implementing short exposure times) the time for which the shutter is open is shorter than the time for which the shutter is closed. In contrast, in other embodiments (implementing long exposure times) the time for which the shutter is open is longer than the time for which the shutter is closed.

Since the samples of the gyroscope 104 are not synchronised with the timings of the frames of the video signal captured by the camera 102, it might be the case that the gyroscope 104 does not generate samples at the midpoints of the frames (frame 1 and frame 2). In which case, the angular velocity of the device 100 at the midpoints of the frames can be determined by interpolating the angular velocity represented by the samples generated by the gyroscope 104. The angular velocity is evaluated by interpolation at any time instant, and the midpoints of the exposure times of the frames define the integral interval used when calculating the angular displacement according to the equation above.

Figure 4:
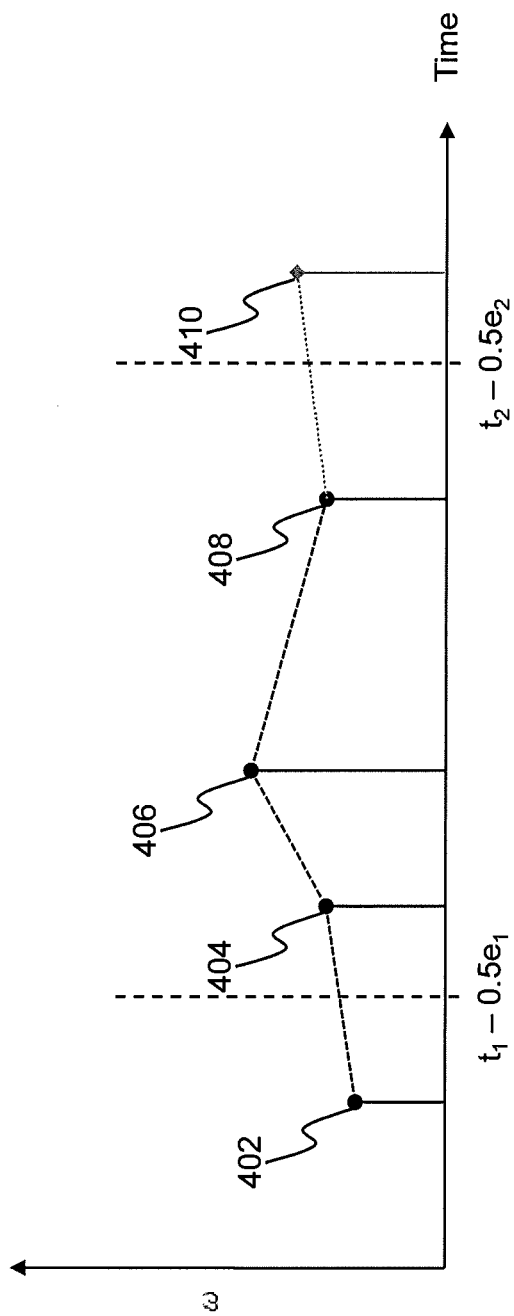
FIG. 4 is an exemplary graphical representation of an angular velocity of a camera over time.

FIG. 4 is an exemplary graphical representation of an angular velocity of the camera 102 over time. The samples representing the angular velocity of the device 100 generated by the gyroscope 104 are shown in FIG. 4 as samples 402, 404, 406, 408 and 410. It can be seen that in the example shown in FIG. 4 the timings of the samples of the gyroscope 104 are not regular. For example, the time between the samples 404 and 406 is shorter than the time between the samples 406 and 408. The dotted line connecting the samples in FIG. 4 shows the value of the angular velocity that can be determined as a function of time by interpolating the angular velocity represented by the samples generated by the gyroscope 104. The interpolated angular velocity (shown by the dotted line) can be integrated between times ($t_1-0.5e_1$) and ($t_2-0.5e_2$) in order to determine the angular displacement of the camera 102 between the first and second frames. FIG. 4 shows a simple linear interpolation between the samples from the gyroscope 104. In other embodiment, more advanced interpolation could be used.

There may arise a situation in which a frame to be stabilized is received at the pre-processor after the latest sample from the gyroscope 104. For example, when the frame 2 is captured at the camera 102 the frame 2 may be received at the pre-processor before any samples from the gyroscope have been generated subsequent to the midpoint of the exposure time of the frame 2 ($t_2-0.5e_2$). For example frame 2 may be received at the pre-processor before the sample 410 shown in FIG. 4. In this situation, delay may be introduced into the video stream, in order for the sample 410 to be received at the pre-processor before the frame 2 is processed, thereby allowing the angular velocity at time ($t_2-0.5e_2$) to be determined before the frame 2 is processed by the pre-processor. Alternatively, the angular velocity may be extrapolated from the previously received samples from the gyroscope 104 in order to determine the angular velocity of the device 100 at the time ($t_2-0.5e_2$).

In the case of no motion of the camera 102 (e.g. for fixed placement of the device 100), the gyroscope 104 may be disabled in order to save battery life. The state of no motion can be determined by feedback from a video encoder which encodes the video signal subsequent to the image stabilization method described herein and implemented by the pre-processor. The video encoder may perform motion estimation as part of the encoding process and as such can determine whether the camera is moving. A state of motion can also be determined and used to enable the gyroscope 104 when the camera 102 is moved. When the device 100 operates in the state of no motion, the motion sensor 104 may be polled at a slow interval to determine whether the device 100 has started moving again. There may be computationally cheaper ways to determine when the device 100 starts moving, depending on hardware and Application Programming Interfaces (APIs) implemented in the operating system of the device 100.

The timings of the operation of the hardware used for the camera 102 and for the gyroscope 104 might not match. This may be because the camera 102 and the gyroscope 104 are implemented in independent hardware chips. Therefore it may be beneficial to add an offset to the time stamps of either (or both) the samples generated by the gyroscope 104 and the frames of the video signal. In this way the timing of the samples from the gyroscope 104 can be matched with the timing of the frames of the video signal correctly. The offset may be constant for a particular combination of hardware chips. Therefore a delay may be computed offline and used at the device 100 without incurring a processing penalty for the method described herein.

In step S208 a pixel displacement representing the motion of the camera 102 is determined. In general, a rotation of the camera 102 results in an approximately constant pixel displacement across the image of a frame of the video signal, independent of distances to objects in the image. This is in contrast to linear camera motion, for which pixel displacement is a function of the distance to the object. A function (or algorithm) mapping the rotation of the device 100 to a pixel displacement depends on parameters of the camera 102 (e.g. focal length and width of lens of the camera 102) and the resolution of the images captured by the camera 102. Encoder feedback can be useful to determine the accuracy of the samples generated by the gyroscope 104 and to adapt the mapping algorithm. There are also some cases of motion and object placement where the stabilization model described herein based on the samples from the gyroscope 104 is not accurate (e.g. for rotation of the camera 102 around a user's face, the user's face may be stable in the middle of the frame but the gyroscope 104 detects rotation and therefore the stabilization process will attempt to stabilize the background) which may be detected by the encoder and fed back to the stabilization algorithm. In this way the stabilization algorithm can be adapted.

The pixel displacement determined in step S208 represents the motion in the images of the frames of the video signal resulting from the motion of the camera 102 (as opposed to motion in the subject matter of the images). In this way, the pixel displacement determined in step S208 represents unwanted motion in the images of the frames of the video signal.

In step S210 the pixel displacement determined in step S208 is filtered. This is done in order to smooth the changes that are applied to the video signal in the image stabilization process over time to thereby provide a smoother stabilized video signal. The filter used to filter the pixel displacement can be designed in different ways, depending on, for example, the resolution of the images captured by the camera 102, the acceptable delay which may be applied to the video signal, and the allowed amount of cropping which can be applied to the images of the original video signal received at the pre-processor from the camera 102. For example, higher resolution video frames may benefit from a larger filter attenuation of high frequency changes to the pixel displacement applied in the image stabilization process. On the other hand, the amount of cropping sets a hard limit to the maximum filter attenuation.

An exponential filter may be used which filters the pixel displacements according to the equation:

$$x\_filt(n)=(1-w)*x\_filt(n-1)+w*x(n),$$

where n represents the frame number of the video signal, x represents the accumulated displacement (or "position"), according to the pixel displacement determined in step S208, and x_filt represents the filtered accumulated displacement which is subsequently used to determine how to align the input image in order to stabilize it as described in more detail below. In this way the filter acts as an exponential filter. When motion stops, x_filt−x will converge to zero which implies no shifting of the image. The filter smoothes out changes to the determined pixel displacement over time, by basing the filtered pixel displacements on the corresponding filtered pixel displacement of the previous frame as well as on the pixel displacement determined for the current frame in step S208. The weighting applied to the filtered pixel displacement of the previous frame is (1−w) whereas the weighting applied to the pixel displacement determined for the current frame is w. Therefore adjusting the weighting parameter, w, will adjust how responsive the filter is to changes in the pixel displacement (x). A recursive (Infinite Impulse Response (IIR)) filter is more suited than a Finite Impulse Response (FIR) filter when the output x_filt is clipped to be in the range [x−crop, x+crop] as the clipped value is fed back to the filter loop and makes subsequent output of x_filt less prone to clipping.

The weighting parameter, w, is adapted to the resolution and instant frame rate of the video signal to obtain a constant physical cut-off frequency, which is measured in Hertz. If the filter were an ideal filter then the physical cut-off frequency would define the highest frequency component of changes to x which will be incorporated into x_filt. Changes to x which have higher frequency than the cut-off frequency will be attenuated by an ideal filter and will not be present in x_filt. However, the filter is not an ideal filter and as such the cut-off frequency defines the highest frequency for which the attenuation applied by the filter is below 3 dB. So for non-ideal filters there will be some attenuation below the cut-off frequency and there will not be perfect attenuation above the cut-off frequency. The filter output is clipped so that that the difference between x_filt and x is not larger than the frame cropping size. w is adapted so that the physical cut-off frequency is constant, e.g. 0.5 Hz. From the filter transfer function, a function w(fc, fs) can be derived that maps a physical cut-off frequency fc to w. When the sampling frequency (frame rate) fs changes, w also changes even though fc is constant. The filter according to the filter equation above is well suited for instant changing of the cut-off frequency (changing w), compared to other filters.

In step S212 the image of the second frame (frame 2) is shifted using the filtered pixel displacement from step S210. In this way the motion in the image of the second frame (relative to the first frame) due to the motion of the camera 102 is attenuated. In other words, the filtered pixel displacement is used to compensate for the motion in the video signal between the first and second frames caused by the motion of the camera, to thereby stabilize the video signal.

The filtered pixel displacements are rounded to full-pixel displacements (i.e. integer-pixel displacements). This allows a simple method to be employed to shift the image of the second frame. The image is represented using a stride value indicating memory space of the image, a plurality of pixel values, a pointer indicating the position of a first pixel of the image, and a width value indicating the width of the image. The shifting of the image comprises adjusting the pointer and the width value without adjusting the stride value. It can be seen that the width value is independent of the stride value which allows the width of the image to be changed without affecting the stride of the image. Therefore the memory space of the image (e.g. in the memory 108) does not need to be changed when the image is shifted (and/or resized). This means that no copying of data in the memory 108 is necessary with this approach. This is in contrast to a conventional method of cropping an image in which the crop area of the image is copied into a new memory area. Copying the crop area may be computationally complex which may be detrimental, particularly when the method is to be implemented on a mobile device in which the processing resources available to the CPU 106 may be limited. With the method described herein, since the width value is independent of the stride value, the new shifted image can be created by changing the pointer and the width while the stride is kept intact.

The image may be represented by multiple image planes, for example a luma plane (Y) and two chroma planes (U and V). The image planes of the input image may be shifted and resized by simply changing the pointers to the luma and chroma planes, thereby modifying the width of the image planes whilst keeping the stride intact. The image planes are shifted by the same amount to ensure that the shifted image planes can be used together to represent the shifted image.

In order for this image shifting process to be implemented, the image planes require respective pointers, i.e. they cannot all be represented by the same, single pointer. Furthermore, as described above, it is necessary that the image has independent width and stride values.

FIG. 5 is a representation of an image before and after a shifting and cropping process. The original image is denoted 502 and the shifted and cropped image is denoted 504. It can be seen that the stride value of the image is left unchanged, whereas the width of the image is reduced. Furthermore, the original pointer points to the top left pixel of the original image whereas the adjusted pointer points to the top left pixel of the shifted and cropped image (which is in a different position to the top left pixel of the original image). In this way the image is shifted and cropped simply be changing the width value and the pointer.

In summary of the method described above, e.g. with reference to FIG. 2, the following stages are implemented in the pre-processor to stabilize the images of the frames of the video signal before the video signal is encoded with a video encoder:

1. the angular displacement of the camera 102 between frame 1 and frame 2 is estimated (step S206);
2. the estimated angular displacement is mapped to a pixel displacement of the image of frame 2 (step S208);
3. unintended motion in the image of frame 2 is removed by applying a filter to the sequence of pixel displacements (or to the accumulated pixel displacements as described above) (step S210); and
4. a stabilized image for frame 2 is created by shifting the image to the position calculated by the filter (step S212). The frame dimensions of the stabilized image for frame 2 are equal or less than the corresponding dimensions of the original image for frame 2. In other words, the stabilized images of the video signal are constructed by cutting out a moving border within the original images of the video signal captured by the camera 102.

In some embodiments, the image stabilization may be reduced when motion blur is present in the video signal. When high levels of motion are experienced by the camera 102, motion blur will be present in the video. Therefore, if the image stabilization described herein is applied to the frames of the video signal, then the resulting video signal will contain motion blur but no motion, which a user may perceive as looking unnatural or weird.

In one embodiment no compensation for motion of the camera 102 is made during the time interval when the camera shutter is open (i.e. the exposure times of the frames of the video signal) e.g. in the time interval $[t_1-e_1, t_1]$. If the exposure time is very short (i.e. the shutter is open for a much shorter time than it is closed for) then this will not make a significant difference. However, if the exposure time is very long (i.e. the shutter is open for a much longer time than it is closed for), then little image stabilization will be applied to the video signal. In this way it is ensured that motion blur will always have the corresponding motion in the video signal, which is perceived as looking more natural to a viewer of the video signal.

Determining the motion of the camera 102 from the samples generated by the gyroscope 104 and determining the shutter speed is particularly advantageous since this information can be used to determine whether or not to apply the image stabilization, in view of the motion blur that the video signal may experience, without adding extra computational complexity.

It is also possible to address the issue of motion blur with no corresponding motion using a pure software stabilizer, rather than the image stabilizer described above which uses the samples from the gyroscope 104 to determine the motion of the camera 102. Software motion estimation typically finds the motion vectors representing centres of shutter speed intervals. Analyzing motion blur and finding what kind of motion produced this blur is more complex with a software stabilizer implementation than when using the samples from the gyroscope 104 to determine the motion of the camera 102, in combination with shutter speed, as described above.

In the embodiments described above, the motion sensor 104 is a gyroscope which generates samples representing the rotational motion of the device 100. In other embodiments, the motion sensor 104 may sense other types of motion, such as translational motion and generate samples representing the translational motion of the device 100. These samples can be used in the same way as described above in relation to the rotational motion to stabilize the video signal. However, as described above, with translational motion the pixel displacement will depend on the distance to the object in the image and so this must be taken into account when determining the pixel displacements. For example, multiple accelerometers may be able to estimate rotational motion, and in this case accelerometers can be used without further modification. For more general translational stabilization, it may become more difficult to implement the method described herein since different areas in the image move by different amounts of pixels. However, if the distance to the object is constant (and known) it may be simple to implement the method with translation motion. Even where the distance to the objects is not constant (but is still known) it would be possible to implement the method with translation motion but extra complication is added in determining the pixel displacements caused by the translation motion of the camera 102.

After stabilizing the video signal the video signal is encoded using a video encoding process. The encoded video signal may be transmitted, e.g. as part of a video call to another user or as a broadcast signal. Therefore, it is important for the video signal to be able to be stabilized and encoded in real-time (i.e. with very little delay) for use in events such as video calls, or other communication events where users are perceptually very aware of delay in the signals. Alternatively, the encoded video signal could be stored at the device 100, e.g. in the memory 108.

The method steps S206, S208, S210 and S212 could be implemented at the device 100 in software or in hardware.

For example, the CPU 106 may execute processing blocks to implement the steps S206, S208, S210 and S212. For example, a computer program product for stabilizing a video signal may be provided, which can be stored in the memory 108 and executed by the CPU 106. The computer program product may be configured so as when executed on the CPU 106 to perform the method steps S206, S208, S210 and S212. Alternatively, hardware blocks may be implemented in the device 100 to implement the steps S206, S208, S210 and S212.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Furthermore, while the described embodiments have been particularly shown and described with reference to various examples, it will be understood to those skilled in the art that various changes in form and detail may be made without departing from the spirit and scope of the claimed subject matter.

What is claimed is:

1. A method of stabilizing a video signal, the method comprising:
   capturing a plurality of frames of the video signal using a camera;
   determining a pixel displacement representing motion in the video signal between first and second frames of the video signal caused by motion of the camera; and
   shifting an image of at least one of the first and second frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein said shifting of the image comprises adjusting the pointer and the width value without adjusting the stride value.

2. The method of claim 1 wherein the image comprises a plurality of image planes which are each represented by a respective plurality of pixel values, a respective pointer indicating the position of a first pixel of the image plane, and a respective width value indicating the width of the image plane, wherein the image planes are shifted together by adjusting their respective pointers and width values without adjusting the stride value.

3. The method of claim 1 further comprising rounding the determined pixel displacement to an integer-pixel displacement.

4. The method of claim 1 further comprising:
   using a motion sensor associated with the camera to generate a plurality of samples representing motion of the camera; and
   using the samples to determine a displacement of the camera between a first frame of the video signal and a second frame of the video signal, wherein the determined displacement is used to determine said pixel displacement.

5. The method of claim 1 further comprising filtering the pixel displacement.

6. The method of claim 1 wherein the motion of the camera is rotational motion.

7. The method of claim 1, wherein shifting the image further comprises keeping the memory space of the image the same without copying data in the memory space for the image when the image is shifted.

8. A device configured to stabilize a video signal, the device comprising:
   a camera configured to capture a plurality of frames of the video signal;
   one or more processors; and
   one or more computer-readable media storing instructions which, when executed by the one or more processors, perform operations comprising:
      determining a pixel displacement representing motion in the video signal between first and second frames of the video signal caused by motion of the camera; and
      shifting an image of at least one of the first and second frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein said shifting comprises shifting the image by adjusting the pointer and the width value without adjusting the stride value.

9. The device of claim 8, wherein the image comprises a plurality of image planes which are each represented by a respective plurality of pixel values, a respective pointer indicating the position of a first pixel of the image plane, and a respective width value indicating the width of the image plane, wherein the image planes are shifted together by adjusting their respective pointers and width values without adjusting the stride value.

10. The device of claim 8, the operations further comprising rounding the determined pixel displacement to an integer-pixel displacement.

11. The device of claim 8, the computing device further comprising a motion sensor, and the operations further comprising:
    using the motion sensor to generate a plurality of samples representing motion of the camera; and
    using the samples to determine a displacement of the camera between a first frame of the video signal and a second frame of the video signal, wherein the determined displacement is used to determine said pixel displacement.

12. The device of claim 8, the operations further comprising filtering the pixel displacement.

13. The device of claim 8, wherein the motion of the camera is rotational motion.

14. The device of claim 8, the operations further comprising keeping the memory space of the image the same without copying data in the memory space for the image when the image is shifted.

15. A computer program product for stabilizing a video signal, the computer program product being stored on a memory of a computing device and configured so as when executed on a processor of the computing device to perform the operations comprising:
- capturing a plurality of frames of the video signal using a camera;
- determining a pixel displacement representing motion in the video signal between first and second frames of the video signal caused by motion of the camera; and
- shifting an image of at least one of the first and second frames in accordance with the pixel displacement to thereby stabilize the video signal, wherein the image comprises a stride value indicating memory space of the image, a plurality of pixel values, a pointer indicating the position of a first pixel of the image, and a width value indicating the width of the image, wherein said shifting of the image comprises adjusting the pointer and the width value without adjusting the stride value.

16. The computer-program product of claim 15, wherein the image comprises a plurality of image planes which are each represented by a respective plurality of pixel values, a respective pointer indicating the position of a first pixel of the image plane, and a respective width value indicating the width of the image plane, wherein the image planes are shifted together by adjusting their respective pointers and width values without adjusting the stride value.

17. The computer-program product of claim 15, the operations further comprising rounding the determined pixel displacement to an integer-pixel displacement.

18. The computer-program product of claim 15, the operations further comprising:
- using a motion sensor associated with the camera to generate a plurality of samples representing motion of the camera; and
- using the samples to determine a displacement of the camera between a first frame of the video signal and a second frame of the video signal, wherein the determined displacement is used to determine said pixel displacement.

19. The computer-program product of claim 15, the operations further comprising filtering the pixel displacement.

20. The computer-program product of claim 15, wherein shifting the image further comprises keeping the memory space of the image the same without copying data in the memory space for the image when the image is shifted.

* * * * *